United States Patent Office 3,842,018
Patented Oct. 15, 1974

3,842,018
OXIDE VARISTOR COMPOSITION CONSISTING OF ZnO, Sb₂O₃ AND/OR Sb₂O₅, ZrO₂, TiO₂ AND/OR GeO₂, AND Bi₂O₃
Noboru Ichinose, 1826-2 Mutsuura-cho, Kanazawa-ku, Yokohama-shi, Japan, and Yuhji Yokomizo, 57-10, 2-chome, Komazawa, Setagaya-ku, Tokyo, Japan
Filed Feb. 8, 1973, Ser. No. 330,713
Int. Cl. H01c 9/00
U.S. Cl. 252—520     1 Claim

ABSTRACT OF THE DISCLOSURE

Oxide varistor comprising a basic composition (totaling 100 mol percent) formed of 87 to 12 mol percent of ZnO, 1 to 30 mol percent of antimony oxide selected from the group consisting of $Sb_2O_3$, $Sb_2O_5$ and a mixture thereof and 12 to 87 mol percent of at least one metal oxide selected from the group consisting of $ZrO_2$, $TiO_2$ and $GeO_2$ and an additive consisting of 0.5 to 10% by weight of $Bi_2O_3$ based on said basic composition.

---

This invention relates to a varistor prepared from an oxide semiconductor. Typical known varistors consisting of a semiconductor are SiC varistors. SiC varistors have nonlinear voltage-current characteristics, namely, are sharply reduced in resistance with higher voltage to permit the passage of current therethrough in amount increased by that extent and have consequently been widely used for absorbing abnormally high voltage or for stabilization of voltage. In recent years, telecommunication apparatus, for example, has come to be formed of transistors, resulting in the low operating voltage of circuits. Accordingly, there is growing demand for a low voltage (or low resistance) type of varistor.

Generally, the voltage-current characteristics of the varistor may be expressed approximately in the following equation:

$$I = (V/C)^\alpha$$

where:

I = current flowing through the varistor
V = voltage across the varistor
C = constant
α = nonlinear voltage coefficient.

Therefore, the characteristics of the varistor may be indicated by C and α or two other constants which can replace them. Since accurate determination of C presents extreme difficulties, C is generally substituted by Voltage Vc at a certain current C ma. With the varistor voltage thus designated as Vc, the voltage-current characteristics of the varistor may be indicated by Vc and the nonlinear constant α.

The nonlinearity of the SiC varistor is derived from the voltage sensitivity of the contact resistance of SiC particles. This SiC varistor is generally prepared by mixing SiC powders with porcelain binder material or conductive material like graphite depending on the object intended and sintering the mass at elevated temperatures after it is molded.

As is well known, the varistor is desired to have as large a nonlinear voltage coefficient α as possible. The aforesaid SiC varistor has a relatively large value (about 3 to 7) of α and is stabilized in other electrical properties, so that it may be deemed as adapted for practical application. Nevertheless, the SiC varistor has the drawback that it presents difficulties in being developed into a low voltage type. To obtain a low voltage SiC varistor, there have been made attempts to form the varistor into a disc shape in order to reduce its resistance or incorporate conductive material like graphite in order to decrease its specific resistivity. In the former attempt, the thinning of the SiC varistor poses problems with its mechanical strength. And in the latter attempt, incorporation of graphite which essentially lacks nonlinearity in connection with resistance will eventually reduce the nonlinear voltage coefficient of a resultant varistor, thus naturally imposing limits on the formation of a low resistance varistor. Further, attempts are being made to render an apparatus using a varistor more compact and efficient and in consequence the varistor is desired to display high performance by a simple circuit arrangement. This holds true not only with low voltage application but also with the voltage level to which the SiC varistor has heretofore been applied.

To date, there has been developed a ZnO oxide varistor whose preparation is characterized by adding 0.1 to 10 atomic percent of $ZrO_2$ to ZnO, sintering the mass in the air at temperatures of 900 to 1500° C. and using glass of lead borosilicate as an electrode. However, this type of varistor indicates a nonlinear voltage coefficient α of 6 at most and is not deemed fully available for practical application. In addition, the U.S. Pat. No. 3,598,763 discloses a manganese-modified zinc oxide varistor, which is neither considered to have a fully large nonlinear voltage coefficient.

It is accordingly the object of this invention to provide in view of the aforementioned circumstances a high performance varistor which permits easy voltage control and has a sufficiently large nonlinear voltage coefficient α for use with high voltage circuits of more than 300 volts included in such apparatuses as colour television receiving sets and electronic ranges.

The varistor of this invention pomprises a basic composition (totaling 100 mol percent) formed of

| | Mol percent |
|---|---|
| ZnO | 87–12 |
| MeO₂ | 12–87 |
| Sb₂O₃ or Sb₂O₅ | 1–30 | where: $MeO_2$ = one selected from the group consisting of $ZrO_2$, $TiO_2$ and $GeO_2$ and a minor component formed of 0.5 to 10% by weight of $Bi_2O_3$ based on said basic composition.

This invention can be more fully understood from the following detailed description when taken in connection with reference to the accompanying drawings, in which:

FIGS. 1 to 4 indicate the voltage-current characteristics of the basic composition of an oxide varistor according to this invention: FIGS. 1 and 2 are curve diagrams showing the relationship of the content of $Sb_2O_3$ and $Sb_2O_5$ defined with respect to the prescribed proportions of ZnO and $MeO_2$ and the resistance of the varistor; and FIGS. 3 and 4 are curve diagrams showing the relationship of the mol ratio of ZnO to $MeO_2$ (with the proportion of $Sb_2O_3$ or $Sb_2O_5$ fixed) and the resistance of the varistor;

The above-mentioned oxide varistor of this invention may be prepared, for example, in the following manner. Raw oxides accurately weighed out to form prescribed proportions are mixed in a ball mill, presintered at relatively low temperatures as 600 to 850° C. and later pulverized, for example, in a ball mill into extremely fine powders. It will be apparent that the raw materials used may consist of other metal compounds convertible to oxides with heat, for example, hydroxides, carbonates and oxalates of metals. The powders obtained are mixed with a binder, for example, polyvinyl alcohol. The mass is molded at a pressure of 100 to 2000 kg./cm.$^2$ into a disc about 8 mm. in diameter and about 1 mm. thick, followed by sintering at temperatures of 1000 to 1400° C. in an electric furnace. Said sintering may generally be carried out in the air and a maximum sintering temperature generally has only to be maintained for 1 to 5 hours.

Figure 1:
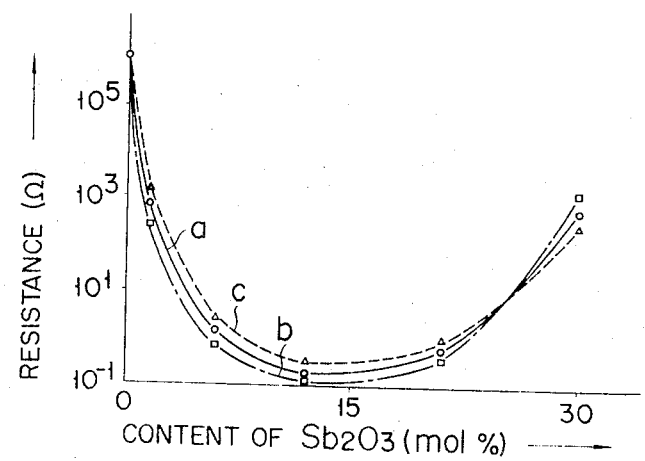
Figure 2:
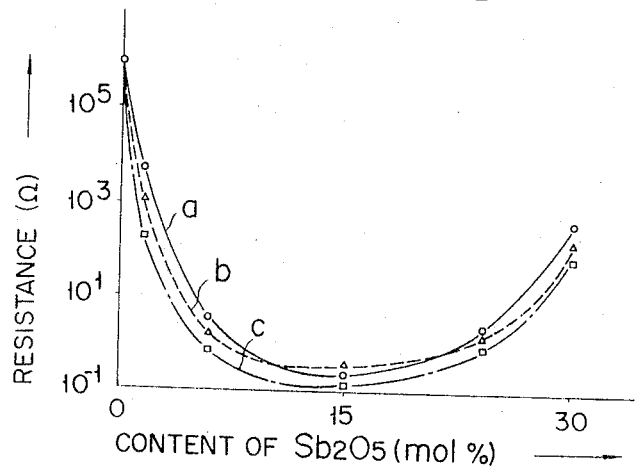

There will now be given the reason why the proportions of the basic constituents of an oxide varistor according to this invention have been limited to the aforementioned ranges. The contents of said basic constituents, namely, $ZnO-MeO_2-Sb_2O_3$ system or $ZnO-MeO-Sb_2O_5$ system have been found to have the undermentioned relationship with the resistance of said varistor. FIGS. 1 and 2 present variations in the resistance of a varistor prepared with the mol ratio of ZnO to $MeO_2$ fixed at 2.0 and the proportion of $Sb_2O_3$ and $Sb_2O_5$ varied. Referring to FIGS. 1 and 2 the curve (a) denotes the case where Me represents Zr, the curve (b) the case where Me represents Ti and the curve (c) the case where Me represents Ge. As apparent from these figures, where the proportion of $$Sb_2O_3 \text{ or } Sb_2O_5$$

rises above 1 mol percent, the resulting varistor is reduced in resistance and adapted for practical application. In contrast, where the proportion of $Sb_2O_3$ or $Sb_2O_5$ exceeds 30 mol percent, the resulting varistor will have an unduly large resistance or lose readiness for sintering, though it may not raise any problem with resistance, thus eventually failing to serve practical application.

Figure 3:
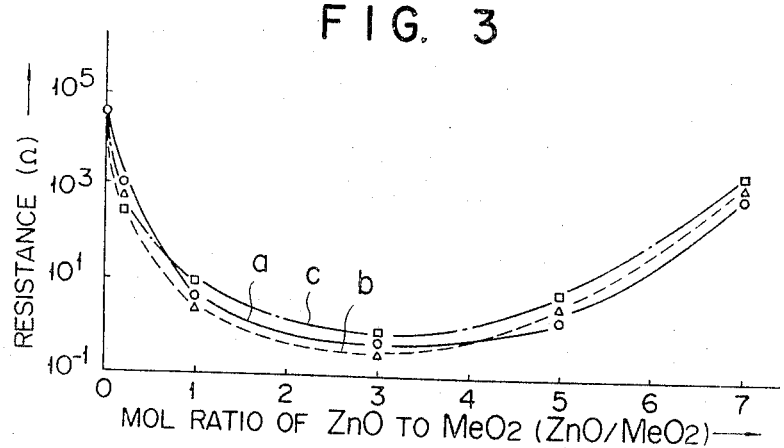
Figure 4:
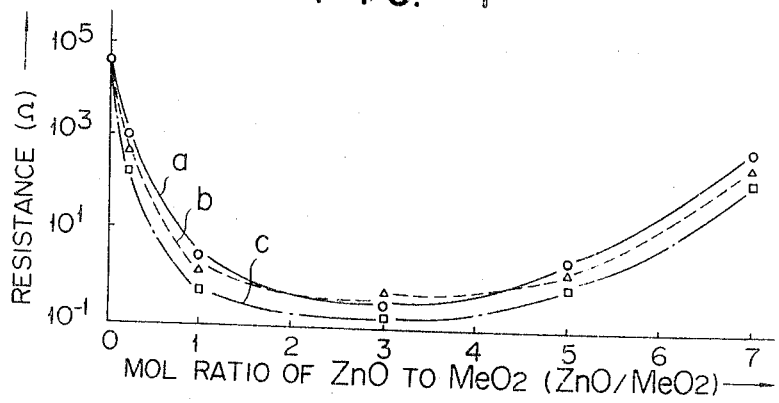

Further, determinations were made of the resistances of $ZnO-MeO_2-Sb_2O_3$ system and $ZnO-MeO_2-Sb_2O_5$ system varistors prepared with the mol ratio of ZnO to $MeO_2$ varied and the proportion of $Sb_2O_3$ and $Sb_2O_5$ fixed respectively to 10 mol percent, the results being presented in FIGS. 3 and 4. Referring to FIGS. 3 and 4, the curve (a) denotes the case of Me=Zr, the curve (b) the case of Me=Ti and the curve (c) the case of Me=Ge. It is seen from these figures that in the case where the proportion of ZnO included in the $ZnO-MeO_2-Sb_2O_3$ system or $ZnO-MeO_2-Sb_2O_5$ system falls outside of the range of 87 to 12 mol percent or in the case where the proportion of $MeO_2$ included in said system departs from the range of 12 to 87 mol percent, then such system will become unsuitable as the basic composition of a varistor according to this invention due to the occurrence of high resistance.

Figure 5:
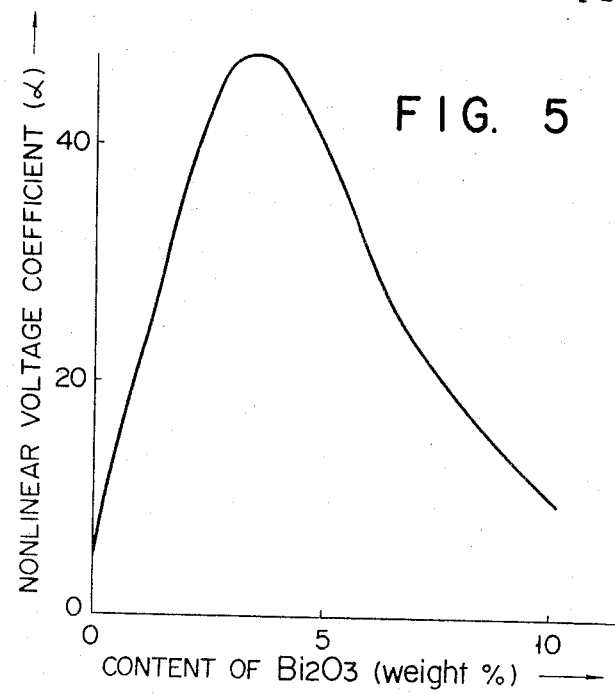
FIGS. 5 and 6 are curve diagrams indicating respectively the relationship of the proportion of $Bi_2O_3$ and the nonlinear voltage coefficient of the oxide varistor of this invention by way of illustrating its properties.
Figure 6:
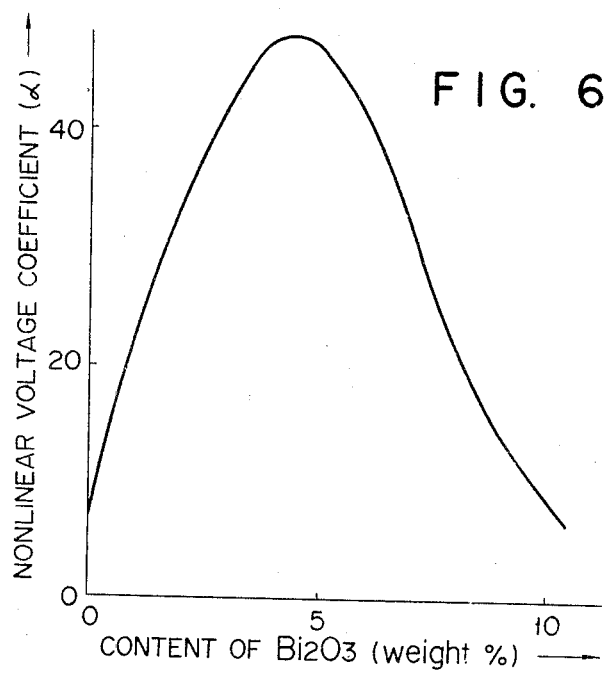

There will now be described the reason why the proportion of the additive of $Bi_2O_3$ is limited to 0.5 to 10% by weight based on the basic composition formed of the $ZnO-MeO_2-Sb_2O_3$ system or $ZnO-MeO_2-Sb_2O_5$ system. Determinations were made of the nonlinear voltage coefficient $\alpha$ of varistors prepared by adding varying amounts of $Bi_2O_3$ to a basic composition formed of, for example, 60 mol percent ZnO-27 mol percent $ZrO_2$-13 mol percent $Sb_2O_3$ or 58 mol percent ZnO-30 mol percent $ZrO_2$-12 mol percent $Sb_2O_5$. Then the nonlinear coefficient measured gave such variations as illustrated in FIGS. 5 and 6. This figure shows that addition of $Bi_2O_3$ in amounts falling outside of the aforesaid range failed to provide a large ($\alpha>7$) nonlinear voltage coefficient. Where $ZrO_2$ was replaced by other $MeO_2$, there were observed the similar tendency as in FIGS. 5 and 6.

The voltage-current characteristics of the oxide varistor according to this invention did not vary in any form of its composition, provided the constituents were incorporated in the prescribed proportions, or even when the electrode was formed of silver or In-Ga alloy.

Figure 7A:
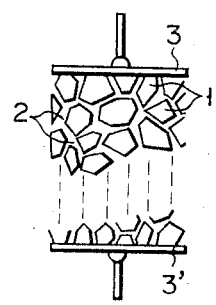
FIG. 7(a) is a sectional view schematically showing the arrangement of sintered crystals of the oxide varistor of this invention.
Figure 7B:
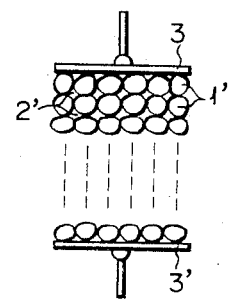
FIG. 7(b) is a sectional view schematically showing the arrangement of the sintered SiC crystals of the prior art SiC varistor.

Though not clearly defined, the reason why the oxide varistor according to this invention displays good voltage-current characteristics is supposed to originate with the following facts. This varistor has such a structure as schematically illustrated in FIG. 7(a). Like the SiC varistor whose structure is schematically shown in FIG. 7(b), the varistor of this invention supposedly derives its nonlinear characteristics from the particular phases of the boundaries between the sintered fine crystals of raw materials used and is constituted by innumerable agglomerations of said boundary phases. Referring to FIGS 7(a) and 7(b), numerals 3 and 3' respectively represent paired electrodes, 1' SiC particles and 2' binding agent. However, the varistor of this invention is widely different from the conventional SiC varistor in that the nonlinearity characteristics of the former varistor originate in the boundary zones between individual grains of the sintered materials, that is, in the contacting zones of the grains, in contrast to SiC varistors whose characteristics originate in contact resistance. Said difference may be deemed to have a prominently favorable effect on the voltage-current characteristics of the varistor of this invention.

The SiC varistor indeed resembles the present varistor in that the voltage of the SiC varistor can be limited within a considerably broad range, namely, its voltage can be adjusted to any desired level by controlling a number of serially arranged nonlinearity boundaries or the width thereof. But the SiC varistor is distinctly different from the varistor of this invention whose voltage-current characteristics and the size of the crystal particle can be relatively freely varied. With the SiC varistor, the size of its crystals is primarily determined by the SiC particles constituting the main raw material which do not widely vary even by the sintering process. With the varistor of this invention, however, the powders of starting raw materials have a particle size ranging preferably approximately between 0.1 and 1 micron. Moreover, said particle size can be increased by sintering to several or scores of microns. The present varistor has the further advantage that not only the particle size but also the specific resistivity of the fine grains of the raw material can be controlled by varying the composition, the kind of additives or the sintering conditions, thereby rendering the varistor more adapted for practical application. In contrast, the SiC varistor does not display much desired nonlinearity characteristics, which is supposed to originate from the fact that SiC itself does not have an appreciably low specific resistivity and said resistivity cannot be easily controlled.

As mentioned above, the fine grains of the varistor of this invention have a far lower specific resistivity than those of SiC, and moreover the particular phases of the boundaries between the grains provide extremely high resistance. Voltage applied to the varistor of this invention is mostly concentrated on said boundaries, presenting a similar performance to that of a Zener diode. The varistor of this invention displays a far more excellent property of withstanding surge voltage than the Zener diode, though the former is different from the latter in that it indicates nonpolar and symmetrical voltage-current characteristics.

This invention will be more fully understood by reference to the examples which follow:

EXAMPLES

There were accurately weighed out ZnO, $MeO_2$, $Sb_2O_3$ and $SbO_5$ constituting a basic composition (where Me represents Zr, Ti or Ge) in the following proportions:

| | Mol percent |
|---|---|
| ZnO | 90–10 |
| $MeO_2$ | 9–89 |
| $Sb_2O_3$ or $Sb_2O_5$ | 1–35 | so as to have a total of 100 mol percent and 0.5 to 12% by weight of $Bi_2O_3$ as an additive. These oxides were fully mixed in a ball mill and presintered at 800° C., and pulverized again in a ball mill, obtaining 188 powdered samples, including controls. The powders were mixed with a binder of polyvinyl alcohol. After molded at a pressure of 1000 kg./cm.², the mass was sintered by heating for one hour at temperatures of 1100 to 1400° C., obtaining discs 1 mm. thick and 8 mm. in diameter. To the discs was baked a silver electrode by the ordinary process.

The silver electrode may be prepared from Ag or Ag₂O with the same effect. The point is that, after baked, the raw material be converted to metallic silver. Baking of said electrode can be effected over a broad range of temperatures as 400 to 800° C., because the varistor samples to which the electrode is baked remain very stable at such temperatures. The voltage-current characteristics of the samples thus prepared were determined by the standard circuit arrangement (with the varistor voltage at room temperature designated as Vc and the nonlinear voltage coefficient as α).

The results are presented in the following table together with the compositions of the sintered samples.

TABLE 1

| Sample number | Basic components (mol percent) | | | Additive Bi₂O₃, wt. percent | Vc (V) | α |
|---|---|---|---|---|---|---|
| | ZnO | Sb₂O₃ | MeO₂ | | | |
| Example: | | | | | | |
| 1 | 87 | 1 | Me=Zr 12 | 0.5 | 338 | 8.4 |
| 2 | 87 | 1 | Me=Ge 12 | 0.5 | 315 | 8.2 |
| 3 | 87 | 1 | Me=Ti 12 | 0.5 | 360 | 8.8 |
| 4 | 87 | 1 | Me=Zr 12 | 5.0 | 954 | 33.0 |
| 5 | 87 | 1 | Me=Ge 12 | 5.0 | 928 | 31.1 |
| 6 | 87 | 1 | Me=Ti 12 | 5.0 | 932 | 32.2 |
| 7 | 87 | 1 | Me=Zr 12 | 10.0 | 406 | 9.2 |
| 8 | 87 | 1 | Me=Ge 12 | 10.0 | 445 | 9.8 |
| 9 | 87 | 1 | Me=Ti 12 | 10.0 | 463 | 10.3 |
| 10 | 70 | 2 | Me=Zr 28 | 1.0 | 568 | 17.9 |
| 11 | 70 | 2 | Me=Ge 28 | 1.0 | 530 | 15.8 |
| 12 | 70 | 2 | Me=Ti 28 | 1.0 | 547 | 16.0 |
| 13 | 70 | 10 | Me=Zr 20 | 2.0 | 651 | 23.1 |
| 14 | 70 | 10 | Me=Ge 20 | 2.0 | 682 | 24.4 |
| 15 | 70 | 10 | Me=Ti 20 | 2.0 | 635 | 22.7 |
| 16 | 70 | 18 | Me=Zr 12 | 3.0 | 594 | 21.8 |
| 17 | 70 | 18 | Me=Ge 12 | 3.0 | 576 | 20.8 |
| 18 | 70 | 18 | Me=Ti 12 | 3.0 | 568 | 20.3 |
| 19 | 70 | 18 | Me=Zr 4, Me=Ge 4, Me=Ti 4 | 3.0 | 620 | 23.0 |
| 20 | 60 | 3 | Me=Zr 37 | 4.0 | 748 | 27.2 |
| 21 | 60 | 3 | Me=Ge 37 | 4.0 | 729 | 25.6 |
| 22 | 60 | 3 | Me=Ti 37 | 4.0 | 783 | 29.4 |
| 23 | 60 | 12 | Me=Zr 28 | 5.0 | 1,500 | 51.8 |
| 24 | 60 | 12 | Me=Ge 28 | 5.0 | 1,416 | 48.3 |
| 25 | 60 | 12 | Me=Ti 28 | 5.0 | 1,482 | 49.5 |
| 26 | 60 | 12 | Me=Zr 14, Me=Ge 14 | 5.0 | 1,517 | 52.3 |
| 27 | 60 | 12 | Me=Zr 14, Me=Ti 14 | 5.0 | 1,537 | 53.6 |
| 28 | 60 | 12 | Me=Ge 14, Me=Ti 14 | 5.0 | 1,501 | 50.7 |
| 29 | 60 | 26 | Me=Zr 14 | 6.0 | 899 | 32.8 |
| 30 | 60 | 26 | Me=Ge 14 | 6.0 | 924 | 34.0 |
| 31 | 60 | 26 | Me=Ti 14 | 6.0 | 976 | 35.2 |
| 32 | 50 | 5 | Me=Zr 45 | 7.0 | 777 | 25.6 |
| 33 | 50 | 5 | Me=Ge 45 | 7.0 | 793 | 26.1 |
| 34 | 50 | 5 | Me=Ti 45 | 7.0 | 812 | 28.4 |
| 35 | 50 | 15 | Me=Zr 35 | 8.0 | 890 | 31.3 |
| 36 | 50 | 15 | Me=Ge 35 | 8.0 | 861 | 30.0 |
| 37 | 50 | 15 | Me=Ti 35 | 8.0 | 846 | 29.2 |
| 38 | 50 | 30 | Me=Zr 20 | 9.0 | 632 | 19.5 |
| 39 | 50 | 30 | Me=Ge 20 | 9.0 | 653 | 21.0 |
| 40 | 50 | 30 | Me=Ti 20 | 9.0 | 606 | 18.9 |
| 41 | 40 | 7 | Me=Zr 53 | 10.0 | 429 | 10.1 |
| 42 | 40 | 7 | Me=Ge 53 | 10.0 | 418 | 10.3 |
| 43 | 40 | 7 | Me=Ti 53 | 10.0 | 401 | 9.8 |
| 44 | 40 | 16 | Me=Zr 44 | 0.5 | 507 | 13.4 |
| 45 | 40 | 16 | Me=Ge 44 | 0.5 | 558 | 15.6 |
| 46 | 40 | 16 | Me=Ti 44 | 0.5 | 537 | 14.9 |
| 47 | 40 | 25 | Me=Zr 35 | 1.0 | 680 | 26.7 |
| 48 | 40 | 25 | Me=Ti 35 | 1.0 | 642 | 23.8 |
| 49 | 40 | 25 | Me=Ge 35 | 1.0 | 603 | 22.5 |
| 50 | 40 | 25 | Me=Zr 15, Me=Ge 10, Me=Ti 10 | 1.0 | 693 | 27.0 |
| 51 | 30 | 1 | Me=Zr 69 | 2.0 | 487 | 14.2 |
| 52 | 30 | 1 | Me=Ge 69 | 2.0 | 516 | 15.6 |
| 53 | 30 | 1 | Me=Ti 69 | 2.0 | 530 | 15.9 |
| 54 | 30 | 10 | Me=Zr 60 | 3.0 | 743 | 29.0 |
| 55 | 30 | 10 | Me=Ge 60 | 3.0 | 716 | 27.3 |
| 56 | 30 | 10 | Me=Ti 60 | 3.0 | 738 | 27.7 |
| 57 | 30 | 16 | Me=Zr 54 | 4.0 | 839 | 30.5 |
| 58 | 30 | 16 | Me=Ge 54 | 4.0 | 808 | 29.4 |
| 59 | 30 | 16 | Me=Ti 54 | 4.0 | 880 | 32.1 |
| 60 | 30 | 16 | Me=Zr 27, Me=Ge 27 | 4.0 | 891 | 33.3 |
| 61 | 30 | 16 | Me=Zr 27, Me=Ti 27 | 4.0 | 887 | 32.6 |
| 62 | 30 | 16 | Me=Ge 27, Me=Ti 27 | 4.0 | 902 | 34.0 |
| 63 | 30 | 30 | Me=Zr 40 | 5.0 | 809 | 31.1 |
| 64 | 30 | 30 | Me=Ge 40 | 5.0 | 767 | 29.8 |
| 65 | 30 | 30 | Me=Ti 40 | 5.0 | 832 | 30.6 |
| 66 | 20 | 10 | Me=Zr 70 | 6.0 | 751 | 24.8 |
| 67 | 20 | 10 | Me=Ge 70 | 6.0 | 766 | 25.3 |
| 68 | 20 | 10 | Me=Ti 70 | 6.0 | 793 | 27.9 |
| 69 | 20 | 18 | Me=Zr 62 | 7.0 | 624 | 17.5 |
| 70 | 20 | 18 | Me=Ge 62 | 7.0 | 615 | 16.9 |
| 71 | 20 | 18 | Me=Ti 62 | 7.0 | 600 | 16.0 |
| 72 | 20 | 25 | Me=Zr 55 | 8.0 | 593 | 16.8 |
| 73 | 20 | 25 | Me=Ge 55 | 8.0 | 564 | 15.6 |
| 74 | 20 | 25 | Me=Ti 55 | 8.0 | 542 | 15.1 |
| 75 | 20 | 30 | Me=Zr 50 | 9.0 | 486 | 13.0 |
| 76 | 20 | 30 | Me=Ge 50 | 9.0 | 468 | 12.7 |
| 77 | 20 | 30 | Me=Ti 50 | 9.0 | 433 | 12.2 |
| 78 | 12 | 1 | Me=Zr 87 | 10.0 | 339 | 8.7 |
| 79 | 12 | 1 | Me=Ge 87 | 10.0 | 316 | 8.2 |
| 80 | 12 | 1 | Me=Ti 87 | 10.0 | 320 | 8.4 |
| 81 | 12 | 10 | Me=Zr 77 | 2.0 | 451 | 11.8 |
| 82 | 12 | 10 | Me=Ge 77 | 2.0 | 430 | 11.2 |
| 83 | 12 | 10 | Me=Ti 77 | 2.0 | 444 | 11.5 |
| 84 | 12 | 22 | Me=Zr 66 | 4.0 | 625 | 17.4 |
| 85 | 12 | 22 | Me=Ge 66 | 4.0 | 611 | 15.8 |
| 86 | 12 | 22 | Me=Ti 66 | 4.0 | 607 | 15.0 |
| 87 | 12 | 22 | Me=Zr 22, Me=Ge 22, Me=Ti 22 | 4.0 | 646 | 18.1 |
| 88 | 12 | 30 | Me=Zr 58 | 0.5 | 327 | 8.6 |
| 89 | 12 | 30 | Me=Ge 58 | 0.5 | 318 | 8.4 |
| 90 | 12 | 30 | Me=Ti 58 | 0.5 | 303 | 8.1 |
| Reference No.: | | | | | | |
| 1 | 90 | 1 | Me=Zr 9 | 2.0 | 275 | 6.4 |
| 2 | 50 | 35 | Me=Ge 15 | 4.0 | 269 | 6.3 |
| 3 | 10 | 1 | Me=Ti 89 | 8.0 | 247 | 6.1 |
| 4 | 50 | 30 | Me=Zr 20 | 12.0 | 218 | 6.0 |
| Example: | | | | | | |
| 101 | 87 | 1 | Me=Zr 12 | 0.5 | 364 | 9.0 |
| 102 | 87 | 1 | Me=Ti 12 | 0.5 | 350 | 8.8 |
| 103 | 87 | 1 | Me=Ge 12 | 0.5 | 392 | 9.7 |
| 104 | 87 | 1 | Me=Zr 12 | 5.0 | 1,035 | 38.6 |
| 105 | 87 | 1 | Me=Ti 12 | 5.0 | 963 | 36.9 |
| 106 | 87 | 1 | Me=Ge 12 | 5.0 | 1,146 | 39.4 |
| 107 | 87 | 1 | Me=Zr 12 | 10.0 | 467 | 12.5 |
| 108 | 87 | 1 | Me=Ti 12 | 10.0 | 451 | 12.0 |
| 109 | 87 | 1 | Me=Ge 12 | 10.0 | 489 | 13.7 |
| 110 | 70 | 2 | Me=Zr 28 | 1.0 | 714 | 28.6 |
| 111 | 70 | 2 | Me=Ti 28 | 1.0 | 690 | 27.1 |
| 112 | 70 | 2 | Me=Ge 28 | 1.0 | 723 | 29.3 |
| 113 | 70 | 10 | Me=Zr 20 | 2.0 | 668 | 25.2 |
| 114 | 70 | 10 | Me=Ti 20 | 2.0 | 637 | 24.0 |
| 115 | 70 | 10 | Me=Ge 20 | 2.0 | 685 | 26.8 |
| 116 | 70 | 18 | Me=Zr 12 | 3.0 | 792 | 33.2 |
| 117 | 70 | 18 | Me=Ti 12 | 3.0 | 768 | 30.9 |
| 118 | 70 | 18 | Me=Ge 12 | 3.0 | 801 | 34.1 |
| 119 | 70 | 18 | Me=Zr 4, Me=Ti 4, Me=Ge 4 | 3.0 | 826 | 34.7 |
| 120 | 60 | 3 | Me=Zr 37 | 4.0 | 869 | 35.0 |
| 121 | 60 | 3 | Me=Ti 37 | 4.0 | 833 | 33.6 |
| 122 | 60 | 3 | Me=Ge 37 | 4.0 | 892 | 35.7 |
| 123 | 60 | 12 | Me=Zr 28 | 5.0 | 1,468 | 50.3 |
| 124 | 60 | 12 | Me=Ti 28 | 5.0 | 1,511 | 53.1 |
| 125 | 60 | 12 | Me=Ge 28 | 5.0 | 1,492 | 52.0 |
| 126 | 60 | 12 | Me=Zr 14, Me=Ti 14 | 5.0 | 1,544 | 54.3 |
| 127 | 60 | 12 | Me=Zr 14, Me=Ge 14 | 5.0 | 1,515 | 52.9 |
| 128 | 60 | 12 | Me=Ti 14, Me=Ge 14 | 5.0 | 1,580 | 55.6 |
| 129 | 60 | 26 | Me=Zr 14 | 6.0 | 1,161 | 41.3 |
| 130 | 60 | 26 | Me=Ti 14 | 6.0 | 1,008 | 40.5 |
| 131 | 60 | 26 | Me=Ge 14 | 6.0 | 1,194 | 42.0 |
| 132 | 50 | 5 | Me=Zr 45 | 7.0 | 869 | 29.1 |
| 133 | 50 | 5 | Me=Ti 45 | 7.0 | 842 | 28.4 |
| 134 | 50 | 5 | Me=Ge 45 | 7.0 | 885 | 30.3 |
| 135 | 50 | 15 | Me=Zr 35 | 8.0 | 960 | 35.6 |
| 136 | 50 | 15 | Me=Ti 35 | 8.0 | 943 | 33.5 |
| 137 | 50 | 15 | Me=Ge 35 | 8.0 | 977 | 36.7 |
| 138 | 50 | 30 | Me=Zr 20 | 9.0 | 712 | 25.2 |
| 139 | 50 | 30 | Me=Ti 20 | 9.0 | 686 | 24.4 |
| 140 | 50 | 30 | Me=Ge 20 | 9.0 | 735 | 26.8 |
| 141 | 40 | 7 | Me=Zr 53 | 10.0 | 538 | 15.6 |
| 142 | 40 | 7 | Me=Ti 53 | 10.0 | 512 | 14.7 |
| 143 | 40 | 7 | Me=Ge 53 | 10.0 | 555 | 16.9 |
| 144 | 40 | 16 | Me=Zr 44 | 0.5 | 580 | 18.3 |
| 145 | 40 | 16 | Me=Ti 44 | 0.5 | 533 | 15.0 |
| 146 | 40 | 16 | Me=Ge 44 | 0.5 | 564 | 16.5 |
| 147 | 40 | 25 | Me=Zr 35 | 1.0 | 691 | 28.1 |
| 148 | 40 | 25 | Me=Ti 35 | 1.0 | 672 | 27.2 |
| 149 | 40 | 25 | Me=Ge 35 | 1.0 | 705 | 28.8 |
| 150 | 40 | 25 | Me=Zr 10, Me=Ti 10, Me=Ge 15 | 1.0 | 726 | 29.2 |
| 151 | 30 | 1 | Me=Zr 69 | 2.0 | 547 | 18.0 |
| 152 | 30 | 1 | Me=Ti 69 | 2.0 | 529 | 16.9 |
| 153 | 30 | 1 | Me=Ge 69 | 2.0 | 560 | 18.7 |
| 154 | 30 | 10 | Me=Zr 60 | 3.0 | 863 | 33.1 |
| 155 | 30 | 10 | Me=Ti 60 | 3.0 | 842 | 32.4 |
| 156 | 30 | 10 | Me=Ge 60 | 3.0 | 891 | 34.3 |
| 157 | 30 | 16 | Me=Zr 54 | 4.0 | 1,002 | 37.0 |
| 158 | 30 | 16 | Me=Ti 54 | 4.0 | 956 | 36.2 |
| 159 | 30 | 16 | Me=Ge 54 | 4.0 | 1,107 | 38.5 |
| 160 | 30 | 16 | Me=Zr 27, Me=Ti 27 | 4.0 | 1,114 | 39.1 |
| 161 | 30 | 16 | Me=Zr 27, Me=Ge 27 | 4.0 | 1,136 | 39.3 |
| 162 | 30 | 16 | Me=Ti 27, Me=Ge 27 | 4.0 | 1,150 | 41.8 |
| 163 | 30 | 30 | Me=Zr 40 | 5.0 | 922 | 36.7 |
| 164 | 30 | 30 | Me=Ti 40 | 5.0 | 881 | 35.0 |
| 165 | 30 | 30 | Me=Ge 40 | 5.0 | 948 | 37.2 |

| Sample number | Basic components (mol percent) | | | Additive Bi₂O₃, wt. percent | Vc (V) | α |
|---|---|---|---|---|---|---|
| | ZnO | Sb₂O₃ | MeO₂ | | | |
| 166 | 20 | 10 | Me=Zr 70 | 6.0 | 810 | 32.1 |
| 167 | 20 | 10 | Me=Ti 70 | 6.0 | 783 | 30.8 |
| 168 | 20 | 10 | Me=Ge 70 | 6.0 | 824 | 32.9 |
| 169 | 20 | 18 | Me=Zr 62 | 7.0 | 698 | 20.0 |
| 170 | 20 | 18 | Me=Ti 62 | 7.0 | 665 | 18.6 |
| 171 | 20 | 18 | Me=Zr 62 | 7.0 | 707 | 20.4 |
| 172 | 20 | 25 | Me=Zr 55 | 8.0 | 704 | 20.3 |
| 173 | 20 | 25 | Me=Ti 55 | 8.0 | 681 | 19.1 |
| 174 | 20 | 25 | Me=Ge 55 | 8.0 | 713 | 21.5 |
| 175 | 20 | 30 | Me=Zr 50 | 9.0 | 498 | 15.0 |
| 176 | 20 | 30 | Me=Ti 50 | 9.0 | 476 | 14.3 |
| 177 | 20 | 30 | Me=Ge 50 | 9.0 | 508 | 15.2 |
| 178 | 12 | 1 | Me=Zr 87 | 10.0 | 382 | 10.4 |
| 179 | 12 | 1 | Me=Ti 87 | 10.0 | 346 | 9.5 |
| 180 | 12 | 1 | Me=Ge 87 | 10.0 | 390 | 11.3 |
| 181 | 12 | 10 | Me=Zr 77 | 2.0 | 516 | 15.2 |
| 182 | 12 | 10 | Me=Ti 77 | 2.0 | 488 | 14.1 |
| 183 | 12 | 10 | Me=Ge 77 | 2.0 | 529 | 15.9 |
| 184 | 12 | 22 | Me=Zr 66 | 4.0 | 714 | 21.8 |
| 185 | 12 | 22 | Me=Ti 66 | 4.0 | 693 | 20.6 |
| 186 | 12 | 22 | Me=Ge 66 | 4.0 | 698 | 20.7 |
| 187 | 12 | 22 | Me=Zr 22 / Me=Ti 22 / Me=Ge 22 | 4.0 | 720 | 22.0 |
| 188 | 12 | 30 | Me=Zr 58 | 0.5 | 340 | 9.3 |
| 189 | 12 | 30 | Me=Ti 58 | 0.5 | 309 | 8.2 |
| 190 | 12 | 30 | Me=Ge 58 | 0.5 | 356 | 9.5 |
| Reference No.: | | | | | | |
| 11 | 90 | 1 | Me=Zr 9 | 2.0 | 302 | 7.0 |
| 12 | 50 | 35 | Me=Ti 15 | 4.0 | 287 | 6.8 |
| 13 | 10 | 1 | Me=Ge 89 | 8.0 | 249 | 6.5 |
| 14 | 50 | 30 | Me=Ti 20 | 12.0 | 210 | 6.2 |

As clearly seen from the above listed examples, the oxide varistor of this invention comprising a basic composition of a ZnO-MeO₂-Sb₂O₃ system or a ZnO-MeO₂-SbO₅ system (where Me represents Zr, Ti or Ge) and an additive of Bi₂O₃ has more excellent properties and can be manufactured with ease and at low cost.

According to the present invention Sb₂O₃ in the

ZnO-MeO₂-Sb₂O₅ system may be intermixed with Sb₂O₅ at any ratio, in which case a similar excellent properties as disclosed above will be acquired.

Further, changes with temperature in the varistor voltage and the surge current measured of some of the examples shown in Table 1 were shown in Table 2. It will be readily understood that the temperature coefficient of the varistor voltage is less than −0.005%, which is much smaller than those known of a Zener diode i.e., about 0.1%, or of SiC varistor i.e., 0.1 to 0.2%. It will be also found that its surge current is very large. It is more than 100 times as high as that for a Zener diode.

TABLE 2

| Example number: | Varistor voltage variation with temperature (percent/° C.) | Surge current (a./cm.²) |
|---|---|---|
| 3 | −0.005 | 2,900 |
| 14 | −0.005 | 3,210 |
| 20 | −0.003 | 3,820 |
| 28 | −0.002 | 4,040 |
| 39 | −0.002 | 3,920 |
| 54 | −0.001 | 3,850 |
| 68 | −0.003 | 3,760 |
| 80 | −0.001 | 3,020 |
| 87 | −0.002 | 2,930 |
| 90 | −0.004 | 2,610 |
| 105 | −0.003 | 3,520 |
| 112 | −0.004 | 3,050 |
| 123 | −0.002 | 4,130 |
| 128 | −0.001 | 4,060 |
| 139 | −0.003 | 3,710 |
| 150 | −0.002 | 3,540 |
| 163 | −0.003 | 3,290 |
| 176 | −0.004 | 2,970 |
| 186 | −0.005 | 2,780 |
| 189 | −0.004 | 2,660 |

What we claim is:

1. An oxide varistor comprising a basic composition (totaling 100 mol percent) consisting of 87 to 12 mol percent of ZnO, 1 to 30 mol percent of antimony oxide selected from the group consisting of Sb₂O₃, Sb₂O₅ and a mixture thereof and 12 to 87 mol percent of at least one metal oxide selected from the group consisting of ZrO₂, TiO₂ and GeO₂, and an additive consisting of of 0.5 to 10% by weight of Bi₂O₃ based on said basic composition.

References Cited

UNITED STATES PATENTS

| | | | |
|---|---|---|---|
| 3,598,763 | 8/1971 | Matsuoka et al. | 252—518 |
| 3,538,022 | 11/1970 | Bowman | 252—518 |
| 3,538,023 | 11/1970 | Bowman | 252—518 |
| 3,503,029 | 3/1970 | Matsuoka | 252—518 X |
| 3,380,936 | 4/1968 | Masuyama et al. | 252—518 X |
| 3,496,512 | 2/1970 | Matsuoka et al. | 338—20 |
| 3,778,743 | 12/1973 | Matsuoka et al. | 252—518 X |
| 3,767,597 | 10/1973 | Masuyama et al. | 252—518 |
| 3,764,566 | 10/1973 | Matsuoka et al. | 252—518 |
| 3,715,701 | 2/1973 | Yperman et al. | 252—520 X |
| 3,699,058 | 10/1972 | Matsuoka et al. | 252—518 |
| 3,687,871 | 8/1972 | Masuyama et al. | 252—518 |
| 3,682,841 | 8/1972 | Matsuoka et al. | 252—518 |
| 3,663,458 | 5/1972 | Masuyama et al. | 252—518 |
| 3,658,725 | 4/1972 | Masuyama et al. | 252—518 |
| 3,634,337 | 1/1972 | Matsuoka et al. | 252—518 X |
| 3,632,528 | 1/1972 | Matsuoka et al. | 252—518 |

LELAND A. SEBASTIAN, Primary Examiner

R. E. SCHAFER, Assistant Examiner

U.S. Cl. X.R.

252—518; 317—238; 338—20, 21